United States Patent
Lee et al.

(10) Patent No.: US 12,303,064 B2
(45) Date of Patent: May 20, 2025

(54) COOKING POUCH

(71) Applicant: CJ CHEILJEDANG CORPORATION, Seoul (KR)

(72) Inventors: Byung Kook Lee, Seoul (KR); Kyoung Sik Cho, Seoul (KR); Seung Min Jeong, Seoul (KR); Sang Bong Lee, Suwon-si (KR); Grace Kim, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 725 days.

(21) Appl. No.: 17/617,128

(22) PCT Filed: Jan. 16, 2020

(86) PCT No.: PCT/KR2020/000788
§ 371 (c)(1),
(2) Date: Dec. 7, 2021

(87) PCT Pub. No.: WO2020/262785
PCT Pub. Date: Dec. 30, 2020

(65) Prior Publication Data
US 2022/0167785 A1  Jun. 2, 2022

(30) Foreign Application Priority Data

Jun. 28, 2019  (KR) .................. 10-2019-0078345

(51) Int. Cl.
*A47J 36/02* (2006.01)
*A47J 36/20* (2006.01)

(52) U.S. Cl.
CPC ............. *A47J 36/027* (2013.01); *A47J 36/20* (2013.01)

(58) Field of Classification Search
CPC ..... A23L 5/13; A23L 5/15; A47J 27/10; A47J 36/027; A47J 36/20; B65D 2205/00; B65D 33/2508; B65D 81/3461
(Continued)

(56) References Cited

U.S. PATENT DOCUMENTS

2011/0033134 A1  2/2011  Madai et al.
2012/0031799 A1  2/2012  Cha et al.
(Continued)

FOREIGN PATENT DOCUMENTS

CN  102372121 A  3/2012
CN  205267850 U  6/2016
(Continued)

OTHER PUBLICATIONS

International Search Report for Application No. PCT/KR2020/000788 dated Apr. 29, 2020.
(Continued)

*Primary Examiner* — Dana Ross
*Assistant Examiner* — Joseph W Iskra
(74) *Attorney, Agent, or Firm* — CANTOR COLBURN LLP (57) ABSTRACT

The present invention relates to a cooking pouch, and more particularly, to a cooking pouch that has a reduced manufacturing unit price and is used to heat food by placing food inside the cooking pouch and putting the cooking pouch inside a microwave, and the cooking pouch enabling steam generated in a cooking process to be appropriately discharged so that excellent food texture and taste may be obtained.

13 Claims, 9 Drawing Sheets

(58) Field of Classification Search
USPC .......................................................... 219/725
See application file for complete search history.

(56) References Cited

U.S. PATENT DOCUMENTS

| | | |
|---|---|---|
| 2017/0247168 A1 | 8/2017 | Kim |
| 2022/0167785 A1 | 6/2022 | Lee et al. |

FOREIGN PATENT DOCUMENTS

| | | | |
|---|---|---|---|
| CN | 106458422 A | | 2/2017 |
| CN | 108209653 A | | 6/2018 |
| CN | 213030510 U | | 4/2021 |
| JP | 1995076304 A | | 3/1995 |
| JP | 200072157 | * | 3/2000 |
| JP | 2000072157 A | | 3/2000 |
| JP | 2003040356 A | | 2/2003 |
| JP | 3655099 B2 | | 6/2005 |
| JP | 2006044708 A | | 2/2006 |
| KR | 1020050107074 A | | 11/2005 |
| KR | 1020080067835 A | | 7/2008 |
| KR | 2020090012015 U | | 11/2009 |
| KR | 20180002522 | * | 8/2018 |
| KR | 2020180002522 U | | 8/2018 |

OTHER PUBLICATIONS

Korean notice of Allowance for Application No. 10-2019-0078345 mailed on Dec. 23, 2020.
Korean Office Action for Application No. 10-2019-0078345 mailed on May 13, 2020.
Written Opinion for Application No. PCT/KR2020/000788 dated Apr. 29, 2020.

* cited by examiner

COOKING POUCH

This application is a National Phase of International Application No. PCT/KR2020/000788 filed on Jan. 16, 2020, which is claims priority of Korean Patent Application No. 10-2019-0078345 filed on Jun. 28, 2019, which is hereby incorporated herein by reference in its entirety for all purposes.

TECHNICAL FIELD

The present invention relates to a cooking pouch, and more particularly, to a cooking pouch that has a reduced manufacturing unit price and is used to heat food by placing food inside the cooking pouch and putting the cooking pouch inside a microwave, the cooking pouch enabling steam generated in a cooking process to be appropriately discharged, thereby being possible to obtain excellent food texture and taste.

BACKGROUND ART

Packaged food, such as food packaged in a pouch, may be heated in a microwave. In this case, the pouch may include a steam outlet to enable discharge of steam generated from the food.

However, while the pouch is being heated, the pouch may burst before the steam outlet is activated to discharge steam or a zipper for closing the pouch may be open, thereby decreasing food texture. For example, for dumplings or the like, steam cooking is necessary. However, when a pouch bursts or a zipper thereof is open, steam cooking may not be sufficiently enabled. In this case, the dumplings may be cooked in partially different states or may be dried.

Therefore, there is a need for a cooking pouch that allows steam to be appropriately discharged in a cooking process and has a reduced manufacturing unit price because a manufacturing process thereof is simple.

DESCRIPTION OF EMBODIMENTS

Technical Problem

The present invention provides a cooking pouch that enables steam to be appropriately discharged in a cooking process and has a reduced manufacturing unit price because and a manufacturing process thereof is simple.

Solution to Problem

Additional aspects will be set forth in part in the description which follows and, in part, will be apparent from the description, or may be learned by practice of the presented embodiments of the disclosure.

According to an embodiment of the present invention, there is provided a cooking pouch including: a sheet having edges fused to one another to form an internal space; and a zipper coupled to the inner surface of the sheet and partitioning the internal space into first and second spaces, wherein the first space of the internal space is below the zipper and the second space of the internal space is above the zipper, and a sealing part at which the zipper and the sheet are fused with each other and a non-sealing part at which the zipper and the sheet are not fused with each other are between the zipper and the sheet.

The zipper may include: a plate part which comes in contact with the inner surface of the sheet and of which at least a portion is fused with the sheet; and a fastener part protruding from the plate part, for opening/closing the cooking pouch, the non-sealing part includes a first non-sealing region, and the first non-sealing region extends in an up/down direction and is opened in the up/down direction by crossing at least a portion of the sealing part in the up/down direction such that the first space communicates with the second space.

A width of the first non-sealing region in a left/right direction may be greater than or equal to 10 mm and less than or equal to 30 mm.

In the first non-sealing region, a left/right-direction width of a part adjacent to the first space may be greater than a left/right-direction width of a part adjacent to the second space.

The sealing part may include a first sealing region and a second sealing region formed below and above the fastener part, respectively, and the non-sealing part may further include a second non-sealing region located between the first sealing region and the second sealing region.

The first non-sealing region may include a $(1-1)^{th}$ non-sealing region located on the same line as the first sealing region and a $(1-2)^{th}$ non-sealing region located on the same line as the second sealing region.

In the $(1-1)^{th}$ non-sealing region, a left/right-direction width of a part adjacent to the first space may be greater than a left/right-direction width of a part adjacent to the second space.

In the $(1-2)^{th}$ non-sealing region, a left/right-direction width of a part adjacent to the first space may be greater than a left/right-direction width of a part adjacent to the second space.

The first space may have a greater volume than the second space.

The sheet may include: a first notch provided at side parts thereof and located below the zipper; and a second notch provided at the side parts thereof and located above the zipper.

The sealing part may be formed by a press tool for transferring heat to the sheet in a state in which the inner surface of the sheet comes in close contact with the zipper such that the sheet is thermally fused with the zipper, and the non-sealing part may be formed by introducing a heat blocking member into at least a portion between the press tool and the sheet to partially block heat transferred from the press tool to the sheet.

Advantageous Effects of Disclosure

A cooking pouch according to the present invention is put inside a microwave in a state of accommodating food therein to be used to heat the food and may appropriately discharge steam generated in a cooking process, and thus, texture and taste of the food may be good.

In addition, the cooking pouch according to the present invention performs exhaust through a non-sealing region between a zipper and a sheet, and thus, a manufacturing unit price thereof may be reduced.

BRIEF DESCRIPTION OF DRAWINGS

The above and other aspects, features, and advantages of certain embodiments of the disclosure will be more apparent from the following description taken in conjunction with the accompanying drawings, in which.

BEST MODE

According to an embodiment of the present invention, there is provided a cooking pouch including: a sheet having edges fused to one another to form an internal space; and a zipper coupled to the inner surface of the sheet and partitioning the internal space into first and second spaces, wherein the first space of the internal space is below the zipper and the second space of the internal space is above the zipper, and a sealing part at which the zipper and the sheet are fused with each other and a non-sealing part at which the zipper and the sheet are not fused with each other are between the zipper and the sheet.

Mode of Disclosure

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 1:
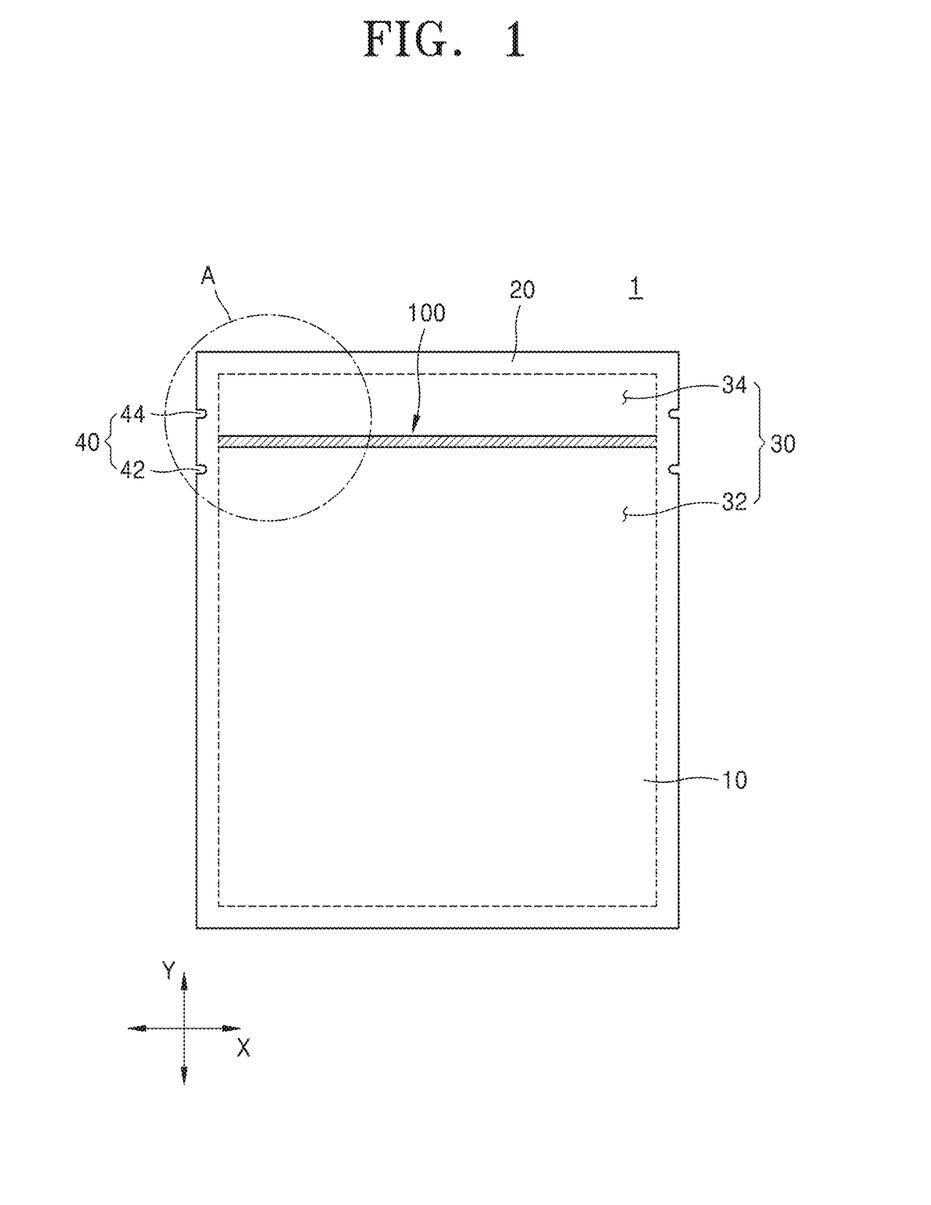
FIG. 1 is a top view of a cooking pouch according to an embodiment of the present invention.
Figure 2:
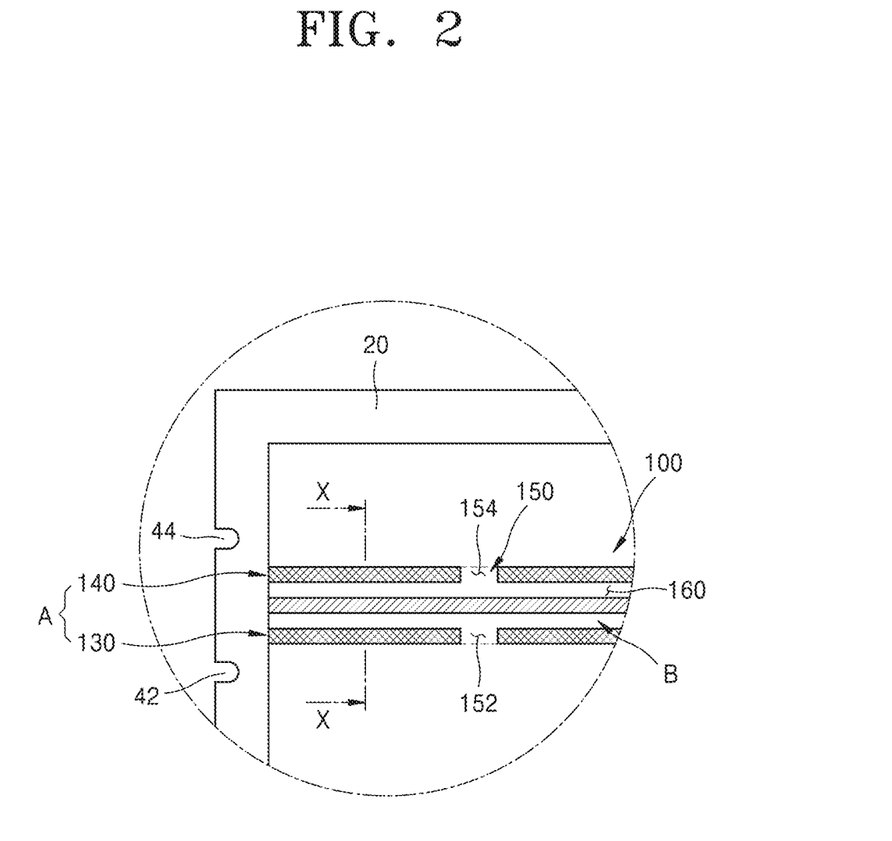
FIG. 2 is an enlarged view of a part A of FIG. 1.
Figure 3:
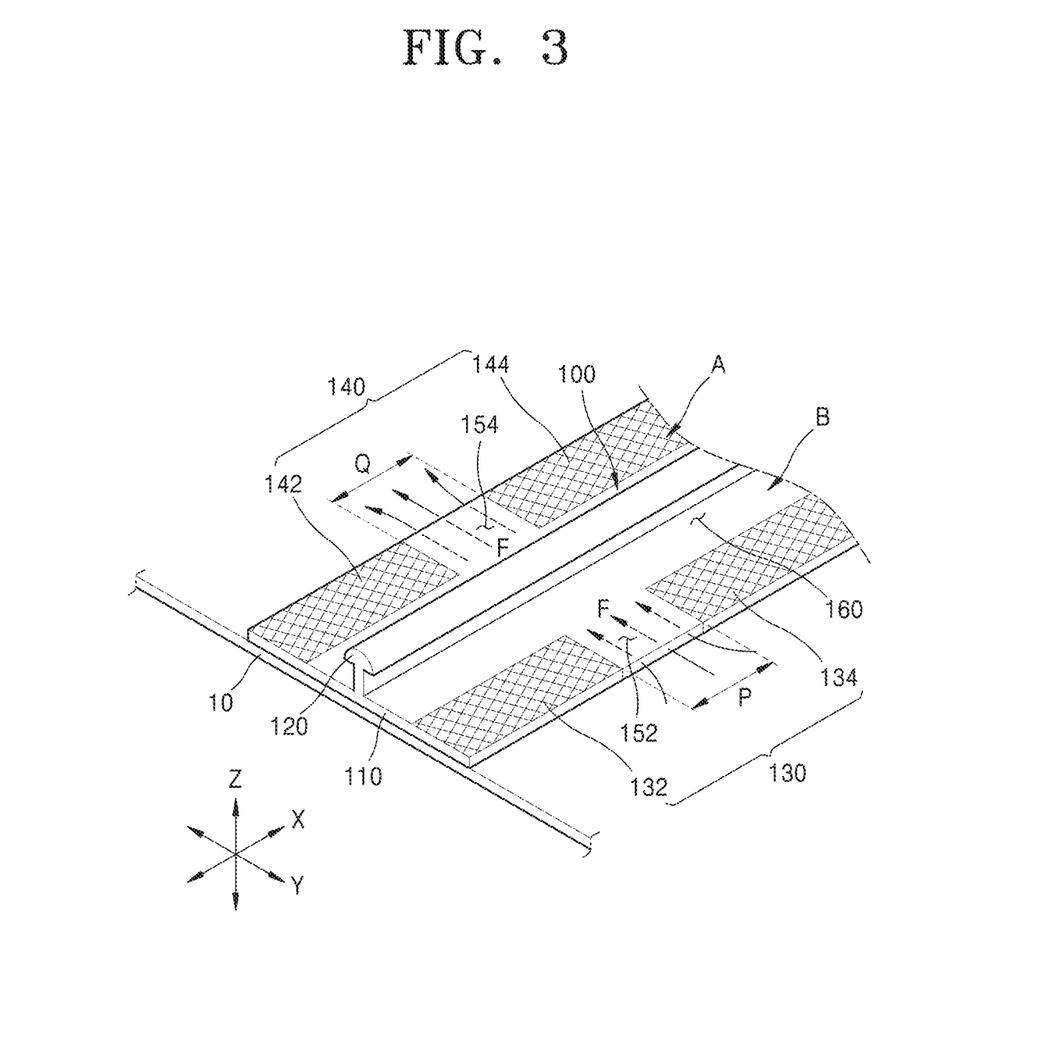
FIG. 3 is a cross-sectional view along line X-X of FIG. 2.

FIG. 1 is a top view of a cooking pouch 1 according to an embodiment of the present invention. FIG. 2 is an enlarged view of a part A of FIG. 1, and FIG. 3 is a cross-sectional view along line X-X of FIG. 2. Hereinafter, a left/right direction indicates an X-axis direction shown in FIG. 1, and an up/down direction indicates a Y-axis direction shown in FIG. 1. Herein up, down, left, and right is based on the directions of FIG. 1. In addition, a forward/backward direction indicates a Z-axis direction shown in FIG. 3. Herein, the forward direction indicates an up direction in the Z-axis direction, and the backward direction indicates a down direction in the Z-axis direction.

According to an embodiment of the present invention, the cooking pouch 1 may include a sheet 10 and a zipper 100.

The sheet 10 may include a synthetic resin film having a certain area. According to an embodiment of the present invention, the cooking pouch 1 may have a fusion part 20 provided outside thereof by fusing edges of two sheets 10 with each other, and a certain volume of an internal space 30 formed inside of the fusion part 20. Herein, an edge indicates an outer circumferential part of the sheet 10 but does not necessarily indicate only the outermost part of the sheet 10. In addition, the two sheets 10 may not necessarily indicate only two separate sheets. For example, according to an embodiment of the present invention, the cooking pouch 1 may be obtained by folding one sheet 10, fusing two parts of the one sheet 10 with each other, and forming the internal space 30 between the fused parts, which does not depart from the scope of the present invention.

Food or the like may be accommodated in the internal space 30.

In addition, the sheet 10 may include a notch 40. The notch 40 is provided to side parts of the sheet 10 to allow the sheet 10 to be easily cut. For example, the notch 40 may include a first notch 42 located at a lower part below the zipper 100 and a second notch 44 located at an upper part above the zipper 100. The upper part and the lower part of the zipper 100 may be cut by using the first notch 42 and the second notch 44, respectively.

The zipper 100 is coupled to the inner surface of the sheet 10. The zipper 100 extends in the left/right direction of the sheet 10. Therefore, the internal space 30 may be partitioned into a first space 32 and a second space 34 by interposing the zipper 100 therebetween. Accordingly, the internal space 30 may include the first space 32 below the zipper 100 and the second space 34 above the zipper 100. The first space 32 may have a greater volume than the second space 34.

A sealing part A and a non-sealing part B may be provided between the zipper 100 and the sheet 10. The sealing part A is a part at which the zipper 100 is fused with the sheet 10. Therefore, the sealing part A may block communication between the first space 32 and the second space 34.

The non-sealing part B may be a part at which the zipper 100 is not fused with the sheet 10. That is, the non-sealing part B may be a gap formed between the zipper 100 and the sheet 10 through non-fusion. The first space 32 and the second space 34 may communicate with each other through the non-sealing part B.

When food is heated by using the cooking pouch 1 according to the present invention, the non-sealing part B may act as a steam exhaust passage. That is, steam generated by heating food in a state in which the food is put inside the first space 32 may be discharged to the outside of the first space 32 through the non-sealing part B. Therefore, burst of the sheet 10 or non-intended opening of the zipper 100 by steam pressure may be prevented. In particular, because the non-sealing part B is formed between the zipper 100 and the sheet 10 (i.e., the non-sealing part B is arranged in the proximity of the zipper 100), it is particularly good to decrease steam pressure to be applied to the zipper 100. Therefore, the arrangement of the non-sealing part B may further effectively prevent the zipper 100 from being opened without intention in a process of heating food.

Hereinafter, a configuration of the zipper 100 and a configuration of the sealing part A and the non-sealing part B formed between the zipper 100 and the sheet 10 will be described in more detail with reference to FIGS. 2 and 3.

The zipper 100 includes a plate part 110 and a fastener part 120.

The plate part 110 comes in contact with the inner surface of the sheet 10, and at least a portion of the plate part 110 is fused with the sheet 10. The plate part 110 has a structure such as a panel having certain widths in the up/down direction and the left/right direction.

The fastener part 120 protrudes from the plate part 110 and substantially performs opening/closing.

As a reference, FIG. 3 only shows one sheet 10 and the zipper 100 coupled to the one sheet 10. Therefore, only a shape of the fastener part 120 included in the zipper 100, which has a protruding fastener head, is shown. However, for the other sheet 10 and the zipper 100 provided to the opposite side of the sheet 10 shown in FIG. 3, the fastener part 120 included in the zipper 100 may have a fastener holder (a part having a groove which the fastener head is inserted into and fixed to). This would be obvious to those of ordinary skill in the art when considering a general configuration of the zipper 100.

The sealing part A includes a first sealing region 130 formed below the fastener part 120 and a second sealing region 140 formed above the fastener part 120. That is, the sealing part A may be formed in a band shape at each of the upper and lower parts of the fastener part 120 by interposing the fastener part 120 therebetween.

The non-sealing part B includes a first non-sealing region 150 and a second non-sealing region 160.

The first non-sealing region 150 extends by crossing the zipper in the up/down direction and is opened in the up/down direction. That is, a lower part of the first non-sealing region 150 is opened toward the first space 32, and an upper part of the first non-sealing region 150 is opened toward the second space 34. Therefore, as described above, the first space 32 may communicate with the second space 34 through the first non-sealing region 150. For example, like arrows F of FIG. 3, steam inside the first space 32 may be discharged to the second space 34 through the first non-sealing region 150.

In this case, the first non-sealing region 150 crosses the zipper 100 in the up/down direction. Therefore, the first non-sealing region 150 partitions (divides) at least a portion of the first sealing region 130 and the second sealing region 140 to the left/right direction. (In addition, it would be obvious that the first non-sealing region 150 crosses at least a portion of the second non-sealing region 160 in the up/down direction.) In this case, the first non-sealing region 150 may include a $(1-1)^{th}$ non-sealing region 152 located on the same line as the first sealing region 130 and a $(1-2)^{th}$ non-sealing region 154 located on the same line as the second sealing region 140.

That is, the first sealing region 130 may be divided into a $(1-1)^{th}$ sealing region 132 and a $(1-2)^{th}$ sealing region 134 in the left/right direction by interposing the $(1-1)^{th}$ non-sealing region 152 therebetween. In addition, the second sealing region 140 may be divided into a $(2-1)^{th}$ sealing region 142 and a $(2-2)^{th}$ sealing region 144 in the left/right direction by interposing the $(1-2)^{th}$ non-sealing region 154 therebetween.

Each of the $(1-1)^{th}$ non-sealing region 152 and the $(1-2)^{th}$ non-sealing region 154 may have a certain width in the left/right direction. That is, the $(1-1)^{th}$ non-sealing region 152 may have a first width P and the $(1-2)^{th}$ non-sealing region 154 may have a second width Q.

The second non-sealing region 160 is located between the first sealing region 130 and the second sealing region 140 in the up/down direction. Therefore, the second non-sealing region 160 may have a band shape formed between the first sealing region 130 and the second sealing region 140. That is, the sealing part A may be divided into the first sealing region 130 located thereabove and the second sealing region 140 located therebelow by interposing the second non-sealing region 160 therebetween. In addition, at least a portion of the second non-sealing region 160 overlaps the fastener part 120 in the forward/backward direction.

The second non-sealing region 160 described above may be generated by not applying heat thereto when the zipper 100 is thermally fused with the sheet 10. When pressure and heat are applied to the whole area of the zipper 100 (the whole area of the plate part 110) to thermally fuse the zipper 100 with the sheet 10, the fastener part 120 may be damaged. Therefore, each of the upper and lower parts of the fastener part 120 may be thermally fused by excluding a part at which the fastener part 120 is located, thereby preventing damage of the fastener part 120. Accordingly, the second non-sealing region 160 may be formed at a part overlapping the fastener part 120, and the first sealing region 130 and the second sealing region 140 may be formed above and below the fastener part 120, respectively.

Figure 4:
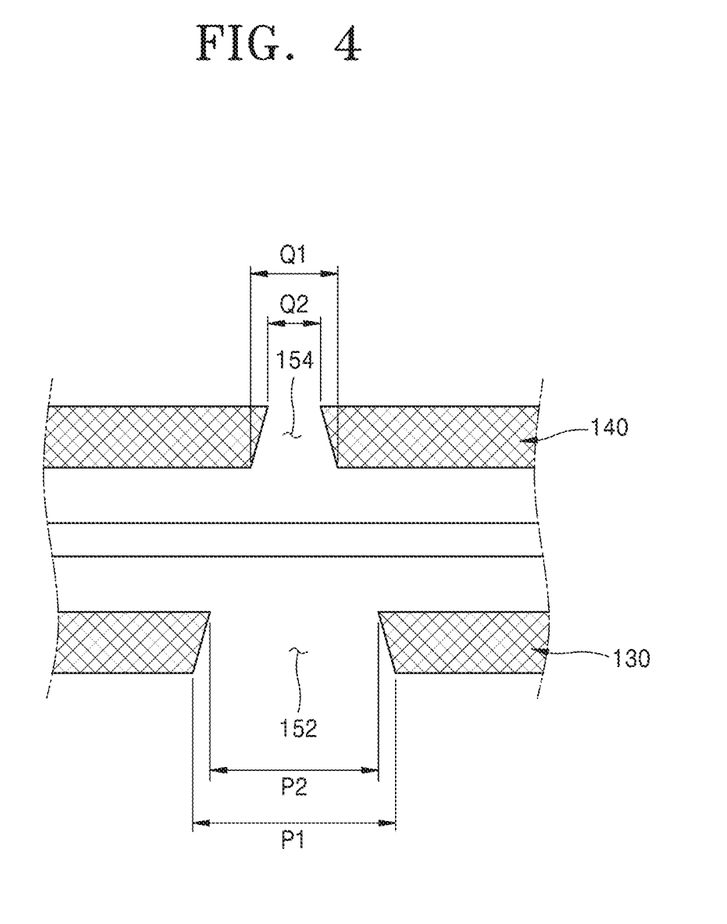
FIGS. 4 to 7 are top views of particular examples of a non-sealing part.
Figure 5:
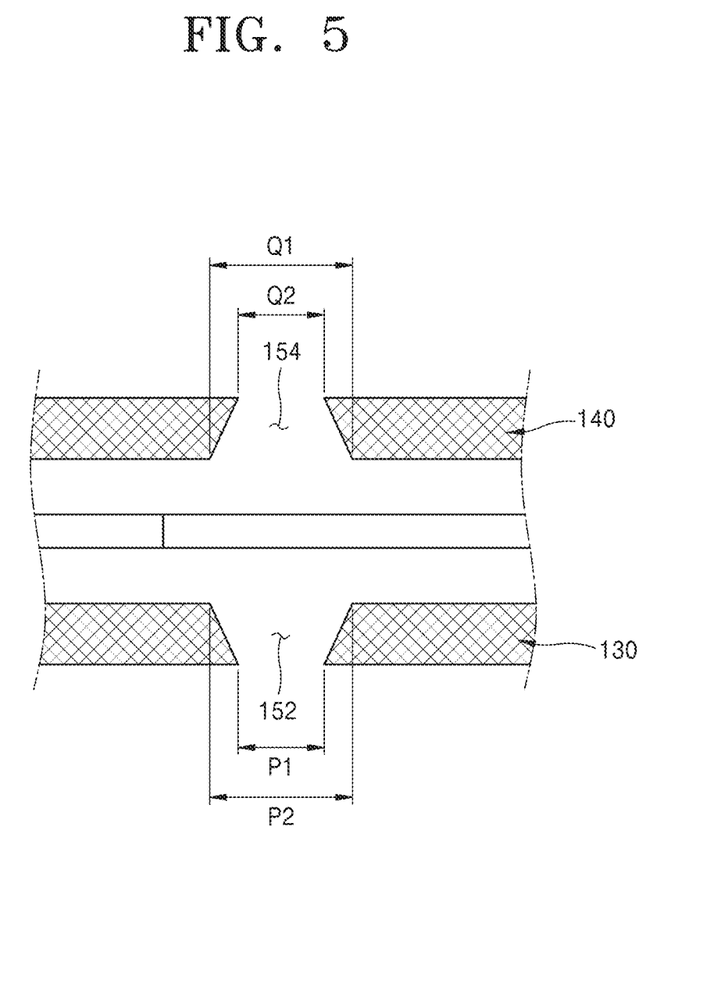
Figure 6:
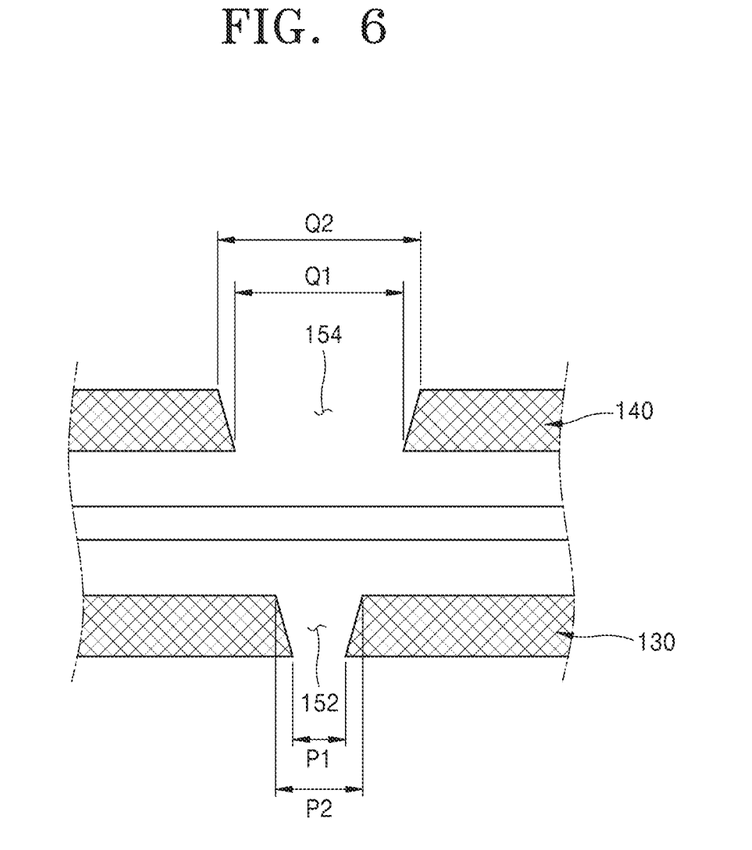
Figure 7:
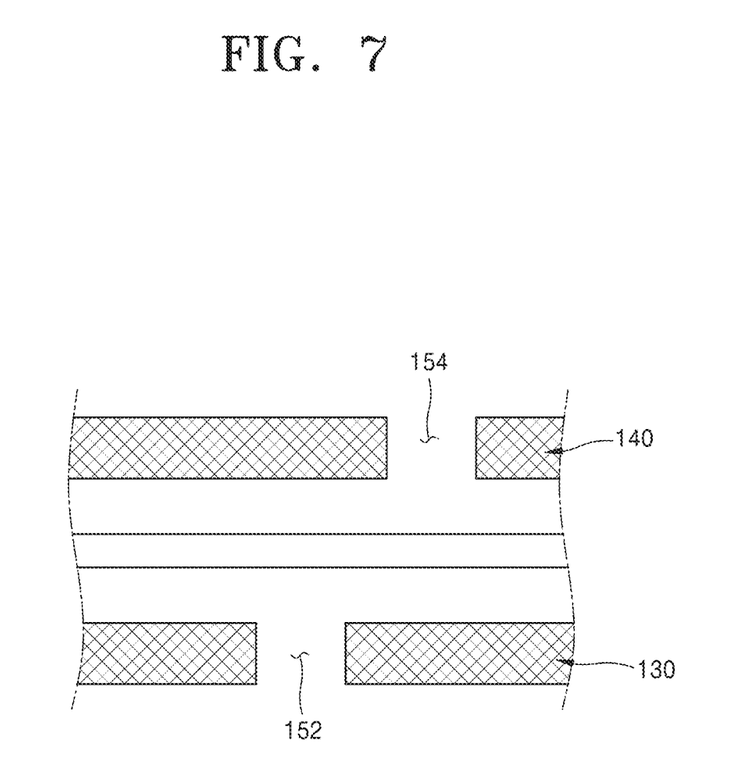

FIG. 4 is a top view of an example of the non-sealing part B, and FIGS. 5 to 7 are top views of comparative examples of the non-sealing part B.

According to an example of the present invention, as shown in FIG. 4, the first non-sealing region 150 may have a shape having a left/right-direction width gradually narrowed in the up direction (a direction from the first space 32 to the second space 34). Therefore, a width P1 of a lower end part of the $(1-1)^{th}$ non-sealing region 152, a width P2 of an upper end part of the $(1-1)^{th}$ non-sealing region 152, a width Q1 of a lower end part of the $(1-2)^{th}$ non-sealing region 154, and a width Q2 of an upper end part of the $(1-2)^{th}$ non-sealing region 154 may have a relationship of $P1 > P2 \geq Q1 > Q2$.

In general, when steam generated in the inside (the first space 32) is discharged, a wider discharge space is better. The reason is because, when a discharge space is wide, steam is easily discharged, and when steam is gathered inside a space to generate pressure, moisture on the surface of food is uniformly transferred into the food such that moistness is maintained.

In addition, it may be preferable that the $(1-1)^{th}$ non-sealing region 152 and the $(1-2)^{th}$ non-sealing region 154 are generally located on the same line in the up/down direction.

In addition, it may be preferable that all of the left and right widths P1, P2, Q1, and Q2 of the $(1-1)^{th}$ non-sealing region 152 and the $(1-2)^{th}$ non-sealing region 154 have a range of 10 mm to 30 mm inclusive. The reason is because, when the first non-sealing region 150 has a width of 30 mm or more, steam pressure is not sufficient (i.e., similar to a generally open state without a sealing region), and thus, a steaming effect in cooking is not enough than expected. In addition, the reason is because, when the first non-sealing region 150 has a width of less than 10 mm, internal pressure during cooking may be too high to cause a case where the zipper 100 is opened without intention.

Therefore, as shown in FIG. 4, as a discharge starting point (the lower end part of the $(1-1)^{th}$ non-sealing region 152) is large, steam is easily discharged, and on the contrary, as a discharge ending point (the upper end part of the $(1-2)^{th}$ non-sealing region 154) is small, internal pressure is generated enough to cause steam to be uniformly spread inside, thereby preventing a surface dryness phenomenon and maintaining a moist surface.

Comparative examples having different shapes from the embodiment described above will now be described below with reference to FIGS. 5 to 7.

For example, as shown in FIG. 5, a case where a lower end part and an upper end part of the first sealing region 150 have narrower left/right-direction widths than inward end parts thereof is described. In this case, the width P1 of the lower end part of the $(1-1)^{th}$ non-sealing region 152, the width P2 of the upper end part of the $(1-1)^{th}$ non-sealing region 152 may have a relationship of P1<P2. In addition, the width Q1 of the lower end part of the $(1-2)^{th}$ non-sealing region 154, and the width Q2 of the upper end part of the $(1-2)^{th}$ non-sealing region 154 may have a relationship of Q1>Q2.

In this case, pressure is concentrated to a steam discharge starting point (the lower end part of the $(1-1)^{th}$ non-sealing region 152), and thus, the pressure may be stronger than an opening strength of the zipper 100. Accordingly, an unstable state in which the zipper 100 may be opened with a sound (i.e., a bursting sound) may occur. Therefore, this comparative example is not preferable.

As another example, as shown in FIG. 6, a case where the first sealing region 150 has a left/right-direction width gradually narrowed in the down direction is described. In this case, the width P1 of a lower end part of the $(1\text{-}1)^{th}$ non-sealing region 152, the width P2 of an upper end part of the $(1\text{-}1)^{th}$ non-sealing region 152, the width Q1 of a lower end part of the $(1\text{-}2)^{th}$ non-sealing region 154, and the width Q2 of an upper end part of the $(1\text{-}2)^{th}$ non-sealing region 154 may have a relationship of P1<P2<Q1<Q2.

As a result of an experiment in a state as shown in FIG. 6, a phenomenon that the zipper 100 is entirely opened during cooking in a microwave occurs. When a test is performed by widening an absolute value of the width P1 while maintaining the same shape as shown in FIG. 6, the zipper 100 is not entirely opened, but a food surface dryness phenomenon occurs due to an increase in a moisture discharge amount. Therefore, the structure shown in FIG. 6 is not suitable for a steam pouch.

As another example, as shown in FIG. 7, a case where the $(1\text{-}1)^{th}$ non-sealing region 152 and the $(1\text{-}2)^{th}$ non-sealing region 154 are not located on a straight line is described. That is, the $(1\text{-}1)^{th}$ non-sealing region 152 and the $(1\text{-}2)^{th}$ non-sealing region 154 are located to be spaced apart from each other in the left/right direction.

When this shape is tested, although a non-sealing part is forcedly structurally made through a seal bar, a phenomenon that a proportion of matching desired design measures is lowered occurs due to a mass production speed. That is, it is attempted that the $(1\text{-}1)^{th}$ non-sealing region 152 and the $(1\text{-}2)^{th}$ non-sealing region 154 are formed to have an asymmetrical shape (located to be spaced apart from each other in the left/right direction), but a designed shape is not produced, and an almost symmetrical shape is produced. Therefore, this structure is not suitable in terms of mass production.

That is, as described above through the comparison with the comparative examples, when the first sealing region 150 has the structure as shown in FIG. 4, a moisture discharge amount during cooking, a steam discharge time, and internal pressure inside a pouch may be appropriately adjusted.

In particular, it may be prevented that the cooking pouch 1 is entirely opened because the zipper 100 is unzipped without intention in a cooking (heating) process. That is, when pressure increase due to an increase in a steam amount inside the first space 32, the zipper 100 may be unnecessarily opened because the zipper cannot stand internal pressure when exhaust through the non-sealing part B is not appropriate. However, according to an embodiment, the first sealing region 150 may have an appropriate shape and position to appropriately discharge steam inside the first space 32, and thus, unnecessary opening of the zipper 100 may be prevented.

In addition, excessive discharge of water in a heating process may be prevented. For example, when a left/right-direction width of the non-sealing part B is large, steam may be excessively discharged. In addition, water generated in a heating process may be discharged to the outside. In this case, steamed cooking may not be sufficiently finished. However, when the width of the non-sealing part B is generally narrowed to prevent this, internal pressure inside the first space 32 cannot be adjusted (the internal pressure inside the first space 32 increases), and thus, the zipper 100 may be opened without intention in a cooking process. However, the left/right-direction width of the first non-sealing region 150 is partially different such that steam may be smoothly discharged in an appropriate range. Simultaneously, a moisture amount in a pouch may be appropriately maintained. Therefore, texture and taste of cooked food may be improved.

Figure 8:
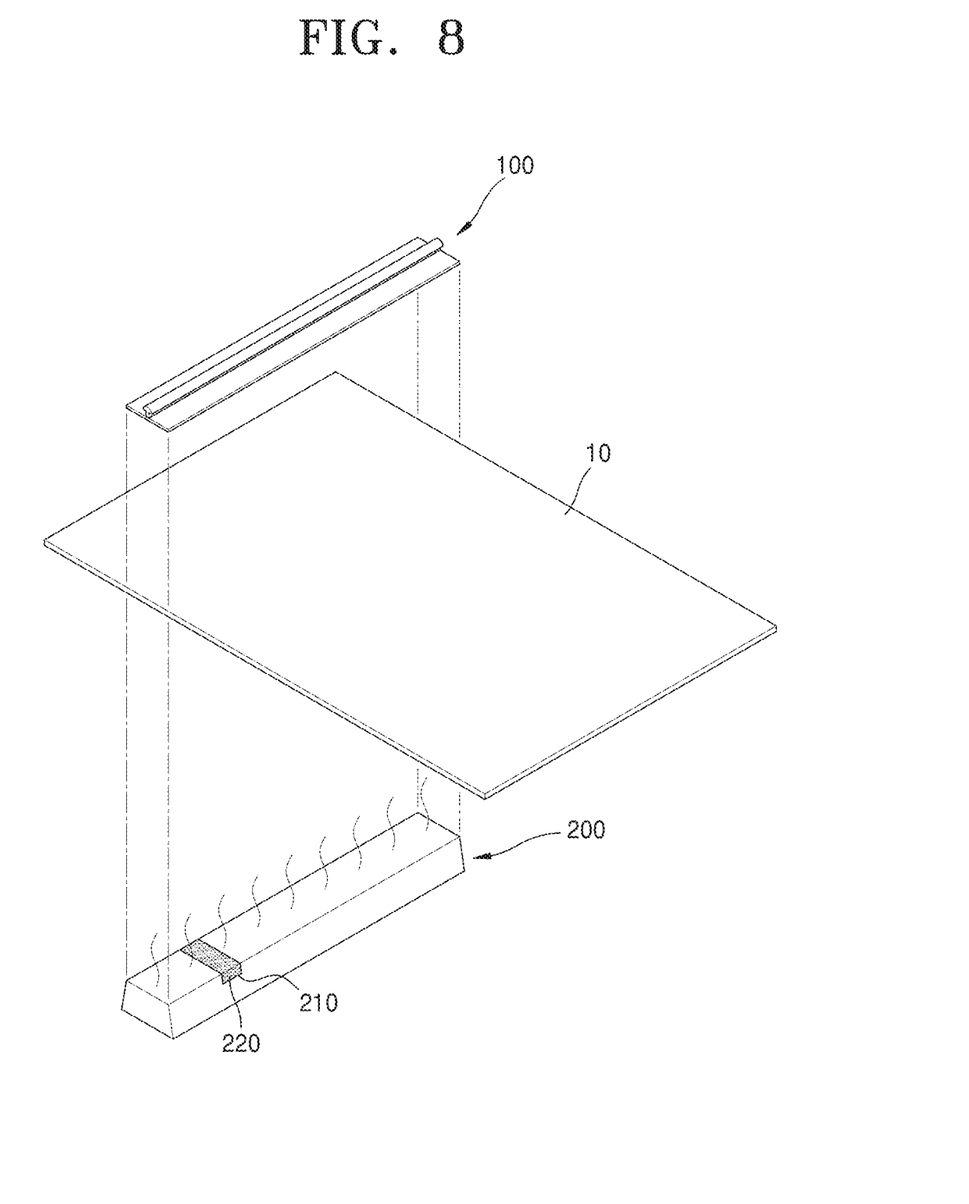
FIG. 8 illustrates forming the non-sealing part in a process of fusing a sheet and a zipper in a method of manufacturing a cooking pouch, according to the present invention.

FIG. 8 illustrates forming the non-sealing part B (accurately, the first non-sealing region 150) in a process of fusing the sheet 10 and the zipper 100 as a portion of a method of manufacturing the cooking pouch 1, according to the present invention.

When the zipper 100 is fused with the sheet 10, a certain press tool 200 may be used. The press tool 200 applies heat such that the zipper 100 is thermally fused with the sheet 10. The press tool 200 is made of a material suitable for heat transfer and may have, for example, a bar shape corresponding to a shape of the first sealing region 130 and the second sealing region 140.

An introduction space 210 such as a groove or a hole may be formed on at least a portion of the press tool 200. A heat blocking member 220 made of a material having a low thermal conductivity, such as Teflon, may be introduced in the introduction space 210. Therefore, a part at which the heat blocking member 220 is located is blocked from heat transferred from the press tool 200, such that the zipper 100 is not thermally fused with the sheet 10. Therefore, the sealing part A is formed at a part to which heat is transferred by the press tool 200, and the non-sealing part B is formed at the part at which the heat blocking member 220 is located.

The non-sealing part B may be simply formed by using the press tool 200. Therefore, the cooking pouch 1 having the features of the present invention may be manufactured by changing only the press tool 200 while generally maintaining an existing process. Therefore, a manufacturing unit price of the cooking pouch 1 according to the present invention may be reduced.

Figure 9:
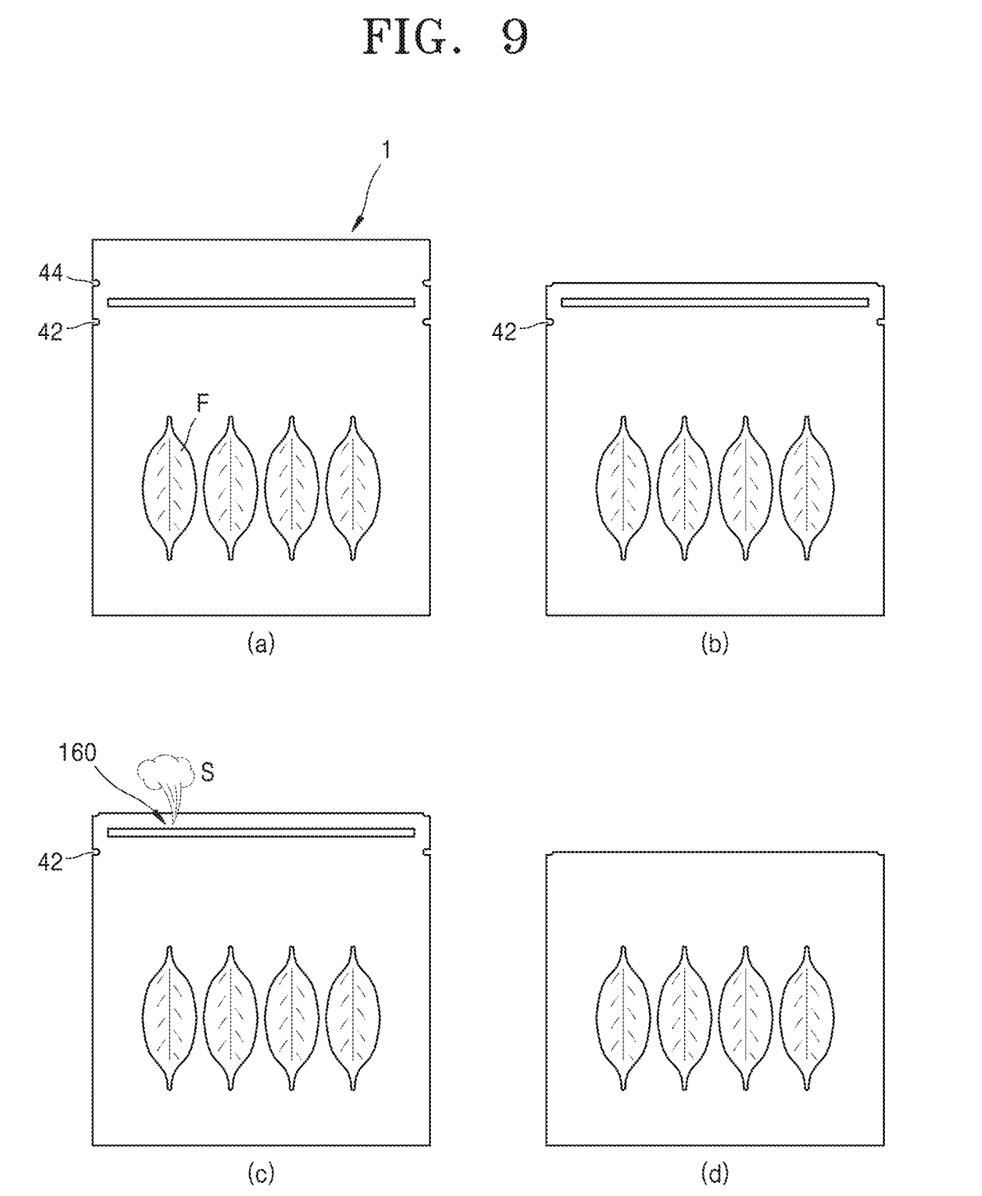
FIG. 9 illustrates food cooking using the cooking pouch according to the present invention.

FIG. 9 illustrates food cooking using the cooking pouch 1 according to the present invention.

First, a product using the cooking pouch 1 according to the present invention may be shipped in a state in which food is packed therein as shown in FIG. 9 (a).

Thereafter, as shown in FIG. 9 (b), an upper end of the sheet 10 is cut by using the second notch 44. Therefore, the second space 34 at the upper part of the zipper 100 is opened.

Although not shown, after the cutting using the second notch 44, a small amount of water may be introduced into the first space 32 by opening the zipper 100. Thereafter, a user may close the zipper 100 and shake the cooking pouch 1 such that the food is sufficiently moist by the water.

Thereafter, as shown in FIG. 9 (c), when the product is put inside a microwave, and heat is applied to the product, the food is cooked. When heat is applied to the food, moisture inside the product and the introduced water are boiled, thereby generating steam. In this case, the steam may be discharged (S) through the non-sealing part B. In this process, a steam discharge amount through the non-sealing part B may be appropriately adjusted by a configuration of the non-sealing part B, and thus, moisture inside the food may be appropriately maintained, and internal pressure inside the first space 32 may also be appropriately maintained.

Next, as shown in FIG. 9 (d), the sheet 10 may be cut by using the first notch 42. In this case, the zipper 100 may be removed, and the first space 32 may be entirely opened. Thereafter, after removing water remaining inside the first space 32, the user may eat the food.

The cooking pouch 1 according to the present invention is put inside a microwave in a state of accommodating food therein to be used to heat the food and may appropriately discharge steam generated in a cooking process, and thus, texture and taste of the food may be good.

In addition, the cooking pouch 1 according to the present invention performs exhaust through a non-sealing region between the zipper 100 and the sheet 10, and thus, a manufacturing unit price thereof may be reduced. In particular, the non-sealing region may be formed by simply changing only a shape of a press tool in a manufacturing process, and thus the manufacturing unit price is good.

In addition, an exhaust structure includes a simple non-sealing region between the zipper 100 and the sheet 10 instead of a separate hole, and thus, moisture and pressure inside the first space 32 in which food is accommodated are maintained to be relatively high, thereby enabling cooking such as steamed dish to be effectively achieved. Therefore, texture of heated food may be better than before.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A cooking pouch comprising:
   a sheet having edges fused to one another to form an internal space; and
   a zipper coupled to the inner surface of the sheet and partitioning the internal space into first and second spaces,
   wherein the first space of the internal space is below the zipper and the second space of the internal space is above the zipper, and
   a sealing part at which the zipper and the sheet are fused with each other and
   a non-sealing part at which the zipper and the sheet are not fused with each other
   are between the zipper and the sheet; wherein the zipper comprises
   a plate part which comes in contact with the inner surface of the sheet and of which at least a portion is fused with the sheet, and
   a fastener part protruding from the plate part, for opening/closing the cooking pouch,
   the non-sealing part comprises a first non-sealing region, and
   the first non-sealing region extends in an up/down direction and is opened in the up/down direction by crossing at least a portion of the sealing part in the up/down direction such that the first space communicates with the second space,
   wherein the sealing part comprises a first sealing region and a second sealing region formed below and above the fastener part, respectively, and
   the non-sealing part further comprises a second non-sealing region located between the first sealing region and the second sealing region.

2. The cooking pouch of claim 1, wherein a width of the first non-sealing region in a left/right direction is greater than or equal to 10 mm and less than or equal to 30 mm.

3. The cooking pouch of claim 1, wherein, in the first non-sealing region, a left/right-direction width of a part adjacent to the first space is greater than a left/right-direction width of a part adjacent to the second space.

4. The cooking pouch of claim 1, wherein the first non-sealing region comprises:
   a (1-1)th non-sealing region located on the same line as the first sealing region; and
   a $(1-2)^{th}$ non-sealing region located on the same line as the second sealing region.

5. The cooking pouch of claim 1, wherein, in the (1-1)th non-sealing region, a left/right-direction width of a part adjacent to the first space is greater than a left/right-direction width of a part adjacent to the second space.

6. The cooking pouch of claim 4, wherein, in the $(1-2)^{th}$ non-sealing region, a left/right-direction width of a part adjacent to the first space is greater than a left/right-direction width of a part adjacent to the second space.

7. The cooking pouch of claim 1, wherein the first space has a greater volume than the second space.

8. The cooking pouch of claim 1, wherein the sheet comprises:
   a first notch provided at a side part thereof and located below the zipper; and
   a second notch provided at the side part thereof and located above the zipper.

9. The cooking pouch of claim 2, wherein the first space has a greater volume than the second space.

10. The cooking pouch of claim 3, wherein the first space has a greater volume than the second space.

11. The cooking pouch of claim 4, wherein the first space has a greater volume than the second space.

12. The cooking pouch of claim 5, wherein the first space has a greater volume than the second space.

13. The cooking pouch of claim 6, wherein the first space has a greater volume than the second space.

* * * * *